(12) United States Patent
Qian et al.

(10) Patent No.: US 11,448,580 B2
(45) Date of Patent: Sep. 20, 2022

(54) BIODETECTOR BASED ON INTERFERENCE EFFECT OF THIN FILM WITH ORDERED POROUS NANOSTRUCTURES AND METHOD FOR USING SAME TO DETECT BIOMOLECULES

(71) Applicant: SOUTHEAST UNIVERSITY, Suzhou (CN)

(72) Inventors: Weiping Qian, Jiangsu (CN); Qianqian Su, Jiangsu (CN); Chen Qian, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 92 days.

(21) Appl. No.: 16/962,838

(22) PCT Filed: Feb. 28, 2019

(86) PCT No.: PCT/CN2019/076427
§ 371 (c)(1),
(2) Date: Jul. 16, 2020

(87) PCT Pub. No.: WO2019/141287
PCT Pub. Date: Jul. 25, 2019

(65) Prior Publication Data
US 2021/0364404 A1    Nov. 25, 2021

(30) Foreign Application Priority Data
Jan. 16, 2018   (CN) .......................... 201810042124.4

(51) Int. Cl.
*G01N 15/06* (2006.01)
*G01B 11/06* (2006.01)
(Continued)

(52) U.S. Cl.
CPC ............. *G01N 15/06* (2013.01); *G01B 11/06* (2013.01); *G01N 1/14* (2013.01); *G01N 2015/0065* (2013.01); *G01N 2015/0693* (2013.01)

(58) Field of Classification Search
CPC ........... G01N 15/06; G01N 2015/0693; G01N 1/14; G01N 2015/0065; G01B 11/06
(Continued)

(56) References Cited

U.S. PATENT DOCUMENTS

2004/0092396 A1 * 5/2004 Glazer ................... B82Y 30/00
502/439
2004/0135081 A1 * 7/2004 Larson ............... G01B 11/0633
250/305
(Continued)

FOREIGN PATENT DOCUMENTS

CN          107121080           9/2017
WO      WO-9514962 A1 *    6/1995    ............. G05D 23/20

OTHER PUBLICATIONS

Stephan, Binding Assay for low Molecular Weight Analytes . . . , Jan. 14, 2014, Creative Commons Attribution, 139, pp. 1987-1992 (Year: 2014).*

(Continued)

*Primary Examiner* — Tarifur R Chowdhury
*Assistant Examiner* — Omar H Nixon
(74) *Attorney, Agent, or Firm* — JCIPRNET

(57) ABSTRACT

The present invention discloses a biodetector based on an interference effect of a thin film with ordered porous nanostructures. The biodetector includes a detection cell, a sensing unit disposed in the detection cell, and an optical fiber spectrometer for detecting reflectometric interference spectra of the sensing unit, wherein the sensing unit is an ordered porous thin film provided with three-dimensional ordered (Continued)

nanopores, and diameters of the nanopores are 20 nm-500 nm. The present invention further discloses a method for using the biodetector to detect biomolecules.

8 Claims, 8 Drawing Sheets

(51) Int. Cl.
  *G01N 1/14* (2006.01)
  *G01N 15/00* (2006.01)
(58) Field of Classification Search
  USPC .......................................................... 356/326
  See application file for complete search history.

(56) References Cited

U.S. PATENT DOCUMENTS

| | | | | |
|---|---|---|---|---|
| 2005/0024642 | A1* | 2/2005 | Rassman | G01N 21/552 |
| | | | | 356/369 |
| 2006/0130557 | A1* | 6/2006 | Leddy | H01M 8/1039 |
| | | | | 73/23.3 |
| 2006/0234391 | A1* | 10/2006 | Weiss | G01N 33/54373 |
| | | | | 435/287.2 |
| 2006/0286488 | A1* | 12/2006 | Rogers | B81C 99/00 |
| | | | | 355/71 |
| 2008/0160858 | A1* | 7/2008 | Paolucci | C23C 16/56 |
| | | | | 442/349 |
| 2008/0231849 | A1* | 9/2008 | Myrick | G01N 21/45 |
| | | | | 356/300 |
| 2009/0009154 | A1* | 1/2009 | Morf | H01L 31/08 |
| | | | | 324/76.19 |
| 2011/0170106 | A1* | 7/2011 | Pacholski | G01N 21/55 |
| | | | | 356/451 |
| 2012/0244554 | A1* | 9/2012 | Giavazzi | G01N 33/54313 |
| | | | | 435/7.4 |
| 2012/0327418 | A1* | 12/2012 | Kashiwazaki | G01N 21/75 |
| | | | | 356/445 |
| 2013/0135617 | A1* | 5/2013 | Pris | G01N 21/554 |
| | | | | 356/326 |
| 2013/0288050 | A1* | 10/2013 | Arruda | C08L 77/10 |
| | | | | 428/338 |
| 2013/0330815 | A1* | 12/2013 | Van Duyne | B82Y 30/00 |
| | | | | 435/287.9 |
| 2016/0282427 | A1* | 9/2016 | Heidmann | G11B 5/012 |
| 2017/0316487 | A1* | 11/2017 | Mazed | G06Q 30/0241 |
| 2018/0113074 | A1* | 4/2018 | Gigler | G01J 3/0229 |

OTHER PUBLICATIONS

Xiaoying, Competitive Protein Adsorption on Biomaterial . . . , Dec. 22, 2014, Elsevier Ltd., 6, pp. 2083-2090 (Year: 2009).*
"International Search Report (Form PCT/ISA/210) of PCT/CN2019/076427", dated May 30, 2019, with English translation thereof, pp. 1-6.

* cited by examiner

BIODETECTOR BASED ON INTERFERENCE EFFECT OF THIN FILM WITH ORDERED POROUS NANOSTRUCTURES AND METHOD FOR USING SAME TO DETECT BIOMOLECULES

CROSS-REFERENCE TO RELATED APPLICATION

This application is a 371 of international application of PCT application serial no. PCT/CN2019/076427, filed on Feb. 28, 2019, which claims the priority benefit of China application no. 201810042124.4, filed on Jan. 16, 2018. The entirety of each of the above mentioned patent applications is hereby incorporated by reference herein and made a part of this specification.

FIELD OF TECHNOLOGY

The present invention relates to the technical field of biological detection, and more particularly to a biodetector and a method for using the biodetector to detect biomolecules.

BACKGROUND

A biosensor is an instrument which is sensitive to a biological substance and can convert the concentration thereof into a detectable signal, and is an analytical tool or a system which uses an immobilized biosensitive material as an identification element (such as enzymes, substrates antibodies, antigens, microorganisms, cells, tissues, nucleic acids and the like), and consists of appropriate physical-chemical transducers (such as oxygen electrodes, light sensitive tubes, field effect transistors, piezoelectric crystals and the like) and a signal amplification appropriate. The biosensor has the functions of a receiver and a converter. The uses of the biosensor relate to a variety of aspects, and one of the most important uses is to study interactions between biomolecules. Biomolecule interaction analysis (BIA) is an existence basis of life; and the interaction between biomolecules closely related to molecular structures is also important information to understand and study the biosystem; the biosensor technology can be used to acquire some basic information pertaining to the interaction between biomolecules, such as kinetics, affinity, binding sites and the like.

At present, labeled analysis is a classical and indispensable research means in the biomedical field. The labeling immunoassay technology, represented by enzyme immunoassay (EIA) and radio immunoassay (RIA), has become a conventional analysis technology in the fields of medical examination, immunology, biochemistry and the like. The labeling method has the following advantages: the method has a high sensitivity and a low background noise and can perform trace analysis. However, the above detection and analysis technology is not perfect. The defects of the conventional labeling immunoassay technology are as follows: bothersome labeling process in an early stage, the improvement of complexity of a detection system due to the introduction of a second antibody, the influence of a radioactive substance on the environment and the like. In addition, when a high dose antigen sample is detected with an enzyme-linked immunosorbent assay (ELISA) method, a dose response curve thereof is in a downward bending trend, and a false low value presents at a high dose level, namely a typical high dose hook (HD-HOOK) effect. The "HD-HOOK effect" may generate serious consequences in clinical examination and may cause a false negative misdiagnosis. The introduction of the second antibody is proved to be an important factor to induce the HD-HOOK effect. To solve the various problems of the labeling immunoassay technology, a new solid substrate material and an optimum immobilization method should be selected to improve the detection sensitivity, linear range and precision thereof. The other effective solution is to fundamentally change the analysis mode. No second antibody or label is used in the new analysis system. That is, the label analysis technology is replaced with a label-free analysis technology. It is particularly important to develop an in-situ, instantaneous, highly sensitive, and highly precise analysis technology on the basis of new principles and new methods.

Detecting the combination of molecules on the surface of a thin film via a reflectometric interference spectroscopy (RIfS) is a new technology developed in recent years. This analysis technology can analyze in real time the interaction between biomolecules, and can study the kinetics of the interaction between biomolecules. Gauglitz et al. established a detection apparatus based on RIfS in 1993, including a light source, a diode array spectrometer, an optical fiber, and a sensing unit (G. Gauglitz, A. Brecht, W. Nahm, "Chemical and biochemical sensors based on interferometry at thin (multi-) layers. Sensor & Actuators B, 1993, 11, 21-27). They designed a gas sensor based on the interference effect of a macromolecular expansion layer which was capable of extremely sensitively detecting the content of a harmful gas in the air (A. Hierlemann, J. Seemann, G. Gauglitz et al., "Chiral discrimination using piezoelectric and optical gas sensors", Nature, 1997, 577, 577-580). Sensitive elements of the interference spectrometer developed since then for biological detection are all planar interference layers. However, the defects of the planar interference layer are obvious: first, the manufacturing cost of the coating layer is expensive, leading to a high detection cost; second, the specific surface area of the planar interference layer is limited, and the amount of the captured biomolecules is limited, therefore, detection sensitivity often cannot satisfy requirements; and finally, the amplitude of the interference spectrum of the interference layer is also limited, and the signal-to-noise ratio is low, which would reduce the detection sensitivity to a certain extent.

SUMMARY

The objective of the present invention: the objective of the present invention is to provide a biodetector based on an interference effect of a thin film with ordered porous nanostructures which is sensitive and can analyze interactions between biomolecules in real time.

Technical solution: the present invention provides a biodetector based on the interference effect of a thin film with ordered porous nanostructures. The biodetector includes a detection cell, a sensing unit disposed in the detection cell, and an optical fiber spectrometer for detecting the reflectometric interference spectrum of the sensing unit, wherein the sensing unit is an ordered porous thin film provided with three-dimensional ordered nanopores, and diameters of the nanopores in the ordered porous thin film are 20 nm-500 nm.

In the biodetector of the present invention, the ordered porous thin film not only can be treated as a reaction cell, but also can be treated as an interference sensitive film. Furthermore, the ordered porous thin film is internally provided with interpenetrating nanopores, and the specific surface area thereof is much greater than that of a planar interference thin film not provided with three-dimensional ordered nanopores; therefore, the ordered porous thin film can capture more molecules to be detected, thereby improving detection sensitivity. In addition, the biodetector has a good interference effect and a high signal-to-noise ratio.

The ordered porous thin film acting as the sensing unit in the present invention can be manufactured with an existing ordered porous thin film manufacturing method; preferably, a vertical deposition method can be used to manufacture colloidal crystal which is also one of ordered porous thin films. On such basis, the colloidal crystal is used as template, and a template method is used to manufacture the ordered porous thin film provided with three-dimensional ordered nanopores. The material of the ordered porous thin film can be selected according to the type and property of the analytes; common materials of the ordered porous thin film include but not limited to silica, polystyrene, polystyrene doped with BTO/ITO nano-particles, epoxy resin, epoxy resin doped with BTO/ITO nano-particles, polymethyl methacrylate (PMMA), or polymethyl methacrylate (PMMA) doped with BTO/ITO nano-particles.

The optical fiber spectrometer is a known optical fiber spectrometer in the art. Specifically, the optical fiber spectrometer includes a broad frequency light source, a Y-type optical fiber bundle, a reflected light probe, an entrance slit, a grating, and a detector. Preferably, the wavelength of the broadcast light source is 400 nm-1200 nm. A propagation path of light in the biodetector is: light source→Y-type optical fiber bundle→sample→reflected light probe→Y-type optical fiber bundle→interface→entrance slit→collimating lens (parallel light)→grating→focusing lens→detector (optical-electrical conversion); and the detector converts an optical signal into an electrical signal, and then transmits the electrical signal to a software control system.

The reflected light probe can be disposed above the ordered porous thin film (the sensing unit), and can also be disposed under the ordered porous thin film (the sensing unit), that is, the reflectometric interference spectrum of the ordered porous thin film can be detected from both sides of the ordered porous thin film. Preferably, the reflected light probe is disposed under the ordered porous thin film (the sensing unit), in which case an upper layer of the ordered porous thin film and an interior of the ordered porous thin film are treated as the reaction cell, and operations during detection are all performed above the ordered porous thin film, thereby having no mutual influence, facilitating operation, and causing no influence to the detection result even when liquid to be detected is muddy.

The biodetector further includes a flow injection system for controlling the flow of liquid in the detection cell, a temperature control system for controlling the temperature in the detection cell, and a software control system for controlling the optical fiber spectrometer and analyzing the reflectometric interference spectrum of the sensing unit to obtain an optical thickness of the sensing unit.

The flow injection system can select any existing devices which can inject a solution of the sample to be detected into the detection cell, for example, a peristaltic pump. The control system can select any software control systems which can control the optical fiber spectrometer and obtain the optical thickness of the sensing unit by analyzing the reflectometric interference spectrum. A method for using the control system to analyze the reflectometric interference spectrum to obtain the optical thickness change of the sensing unit includes the following steps:

1) obtaining the reflectometric interference spectrum of the sensing unit;

2) using a single peak fitting method or a multi-peak fitting method to obtain a time dependent curve of the optical thickness of the sensing unit according to the reflectometric interference spectrum obtained in the step 1);

In another aspect, the present invention provides a method for using the biodetector to detect biomolecules. The method includes the following steps:

1) modifying the ordered porous thin film, and enabling the ordered porous thin film to immobilize biomolecules to be detected, wherein when the sample to be detected is a simple sample, that is, the sample to be detected only contains the biomolecules to be detected, the modification can be any modification mode which can immobilize the biomolecules to be detected onto the ordered porous thin film, for example, hydrophobic treatment and the like; and when the sample to be detected is a complex sample containing a plurality of ingredients, the modification refers to a process of enabling the ordered porous thin film to specifically immobilize the biomolecules to be detected;

2) injecting a sample solution to be detected into the detection cell, and detecting the time dependent curve of the optical thickness of the ordered porous thin film; and 3) qualitatively or quantitatively analyzing the biomolecules to be detected according to the time dependent curve of the optical thickness of the ordered porous thin film detected in the step 2).

In the step 1), a dispersion medium used in the sample to be detected can be selected according to the specific type of the biomolecules to be researched, such as water, an organic solvent, or a buffer solution and the like.

In the step 2), the solution of the sample to be detected injected into the detection cell can be injected into the detection cell in one time, and can also be injected into the detection cell at a constant speed by an apparatus such as a peristaltic pump and the like. The method of detecting the time dependent curve of the optical thickness of the ordered porous thin film includes the following steps:

1) obtaining the reflectometric interference spectrum of the sensing unit; and 2) using a single peak fitting method or a multi-peak fitting method to obtain a time dependent curve of the optical thickness of the sensing unit according to the reflectometric interference spectrum obtained in the step 1).

In the step 3), qualitatively or quantitatively analyzing the biomolecules to be detected comprises analyzing the concentration, the binding rate, the interaction, or the geometric sizes of the biomolecules in the sample solution to be detected.

In order to obtain an accurate detection result, before the time dependent curve of the optical thickness of the sensing unit is obtained, the method may further include the steps of establishing a template thickness measurement model and detecting an optical thickness response baseline of the biodetector. Establishing a template thickness measurement model includes: performing background scan and reference scan on the biodetector, and selecting a fitting method (single peak fitting or multi-peak fitting) for obtaining the optical thickness.

The present invention has the following beneficial effects:

1. The present invention uses the ordered porous thin film provided with three-dimensional ordered nanopores as the sensing unit of the biodetector; the ordered porous thin film is internally provided with interpenetrating nanopores, and the specific surface area thereof is much greater than that of a planar interference thin film; therefore, the ordered porous thin film can capture more molecules to be detected, thereby improving detection sensitivity. The ordered porous thin film not only can be treated as a reaction cell, but also can be treated as an interference thin film. The ordered porous thin film has a good interference effect, a high signal-to-noise ratio, a highly repeatable interference spectrum, a small difference between different batches, and thereby a bright commercialization prospect. After analytes immobilized on the pore surface of the thin film, the reflectometric interference spectra would shift; and the spectra shift can be used to quantitatively or qualitatively analyze in real time the concentration, binding rate, and geometric size of the analytes in the sample.

2. Most existing biosensors adopt a covalent method to immobilize antibodies or oligonucleotide chains on the surface of a hydrophilic polymer via a bridging molecule (for example, carboxymethyl dextran, polyethylene glycol); the manufacturing steps are too many, and the manufacturing process is bothersome. In the present invention, the material of the ordered porous thin film acting as the sensing unit has a good hydrophobicity; a biosensitive layer can be manufactured with a physical adsorption method; by introducing reasonable immobilized protein and occludin, the present invention simplifies the manufacturing of the sensitive layer, and reduces cost while inhibiting non-specific adsorption.

DESCRIPTION OF THE EMBODIMENTS

Figure 1:
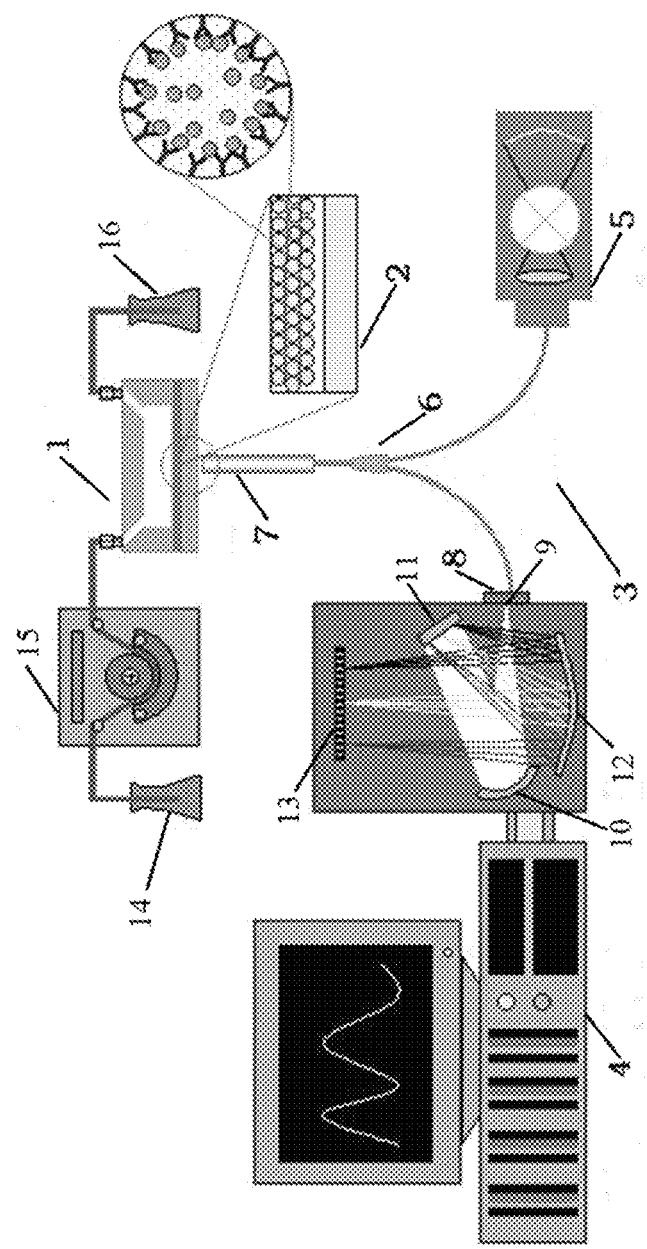
FIG. 1 is schematic view of an overall structure of the biodetector.

A typical embodiment of the present invention provides a biodetector. as shown in FIG. 1, the biodetector includes a detection cell 1, a sensing unit 2 disposed in the detection cell 1, an optical fiber spectrometer 3 for detecting reflectometric interference spectrum of the sensing unit 2, and a control system 4. The sensing unit 2 is an ordered porous thin film provided with three-dimensional ordered nanopores.

Figure 3:
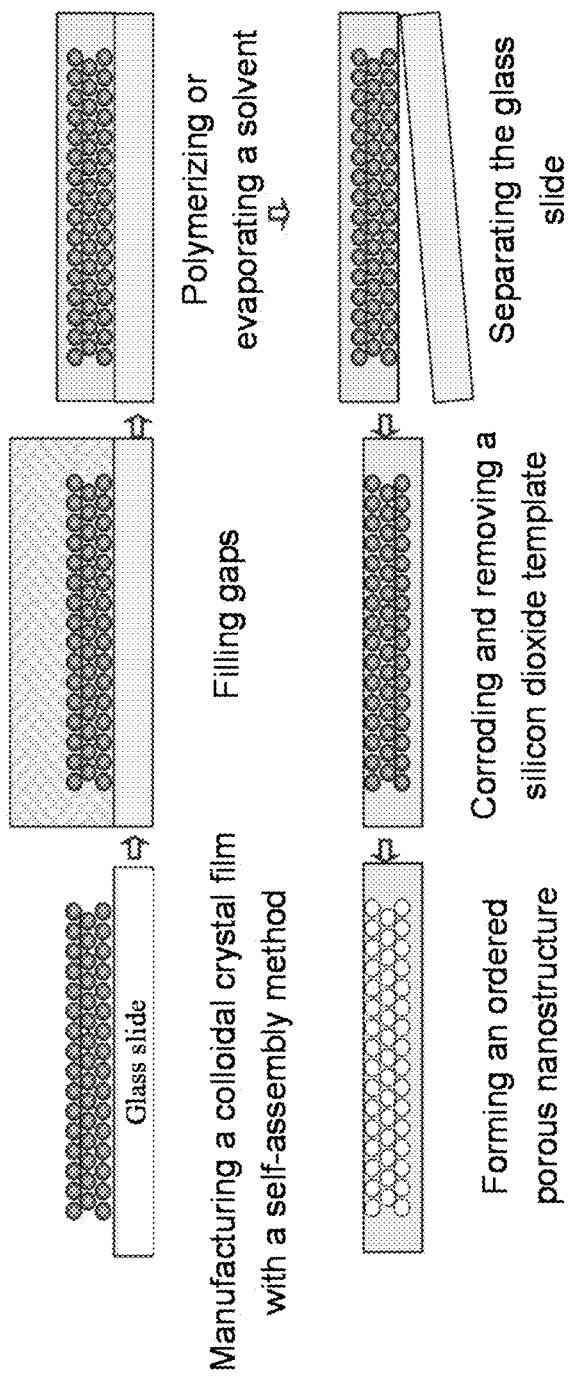
FIG. 3 is a schematic view showing the principle of the template method for manufacturing the ordered porous thin film.

The pore diameter and used material of the ordered porous thin film can be selected according to the type of a sample to be detected, for example, the ordered porous thin film can be a silica colloidal crystal thin film provided with three-dimensional ordered nanopores, or a polystyrene or epoxy resin ordered porous thin film manufactured with a template method and provided with three-dimensional ordered nanopores. The silica colloidal crystal thin film can be manufactured with a known method in the literature, for example, a vertical deposition method is used to manufacture the colloidal crystal template. The template method includes: using a silica colloidal crystal thin film manufactured with a vertical deposition method as a template, filling a solution of a thin film material in the gap of the silica colloidal crystal template, forming the thin film material with a solvent evaporation method, separating the formed thin film from the glass substrate, then removing the template by means of a hydrofluoric acid corrosion process, and forming the thin film with ordered porous nanostructures (as shown in FIG. 3). The material of the thin film can be selected according to the type and property of the sample to be detected; and common materials of the ordered porous thin film include but not limited to polystyrene and epoxy resin.

The optical fiber spectrometer 3 is configured to detect and record the change of the reflectometric interference spectrum during detection, and can be a known optical fiber spectrometer in the art which can be used to detect the reflectometric interference spectrum.

Preferably, the optical fiber spectrometer 3 includes a broad frequency light source 5, a Y-type optical fiber bundle 6, a reflected light probe 7, an interface 8, an entrance slit 9, a collimating lens 10, a grating 11, a focusing lens 12, and a detector 13. Preferably, the wavelength of the broadcast light source is 400 nm-1200 nm. The Y-type optical fiber bundle 6 consists of seven silica optical fibers with a 200 μm diameter, wherein the surrounding six optical fibers act as lights, and the middle one collects reflected light; and the interfaces thereof with the broad frequency light source 5 and the entrance slit 9 both adopt standard SMA905 interfaces. The connector is configured to fix the relative positions of the optical fiber, the slit, and a filter plate, and adopts a standard SMA905 interface. The entrance slit 9 is configured to control the luminous flux entering the spectrometer, and can also control the luminous flux by selecting different pore diameters of gratings. The grating 11 can be selected according to specific requirements. The detector 13 adopts a CCD detector. In the biodetector, a propagation direction of light is: broad frequency light source 5→Y-type optical fiber bundle 6→sensing unit 2→reflected light probe 7→Y-type optical fiber bundle 6→interface 8→entrance slit 9→collimating lens 10 (parallel light)→grating 11→focusing lens 12→detector 13; and the detector 13 converts an optical signal into an electrical signal, and then transmits the electrical signal to the control system 4. In addition, in FIG. 1, 14 is a waste liquid bottle, 15 is the peristaltic pump, and 16 is a sample bottle.

The software control system can select any software control systems which can control the optical fiber spectrometer and obtain the optical thickness of the sensing unit by analyzing the reflectometric interference spectrum. The method for using the software control system to analyze the reflectometric interference spectrum to obtain the change of optical thickness of the sensing unit includes the following steps:

1) obtaining the reflectometric interference spectrum of the sensing unit; and
2) using a single peak fitting method or a multi-peak fitting method to obtain the optical thickness of the sensing unit according to the reflectometric interference spectrum obtained in the step 1).

The time dependent curve of the optical thickness of the sensing unit can be drawn in real time by repeating the steps 1) and 2).

Figure 2:
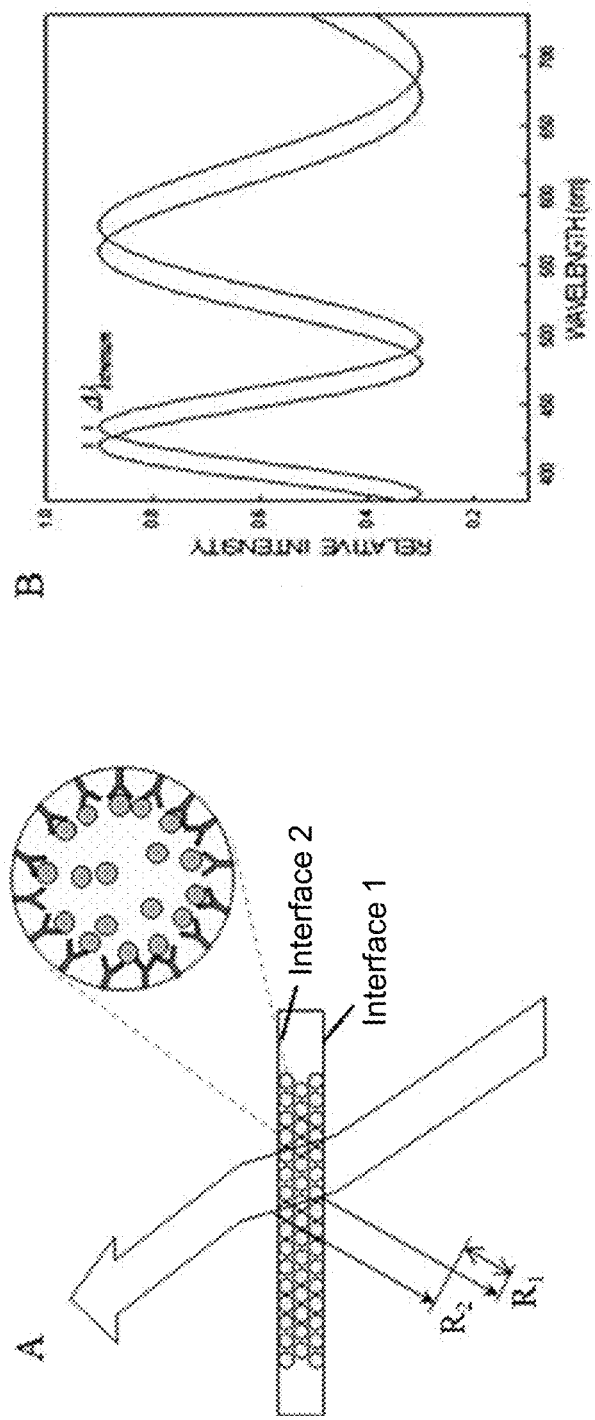
FIG. 2 is a schematic diagram how to use the biodetector to detect the optical thickness of the transparent ordered porous thin film, wherein A of FIG. 2 is a schematic diagram how interference spectrum is generated; B of FIG. 2 is a typical reflectometric interference spectrum modulated by $\cos(1/\lambda)$; and the optical thickness of the thin film can be calculated by detecting $\Delta\lambda_{extremum}$.

The principle how the present invention utilizes interference effects to detect the optical thickness of the transparent thin film is shown in A of FIG. 2. The light is partially reflected by the two interfaces of the thin film. According to different incident angles, wavelengths, physical thicknesses of the thin film, and refractive indexes, a part of reflected beams are superimposed to generate a unique interference spectrum—the maximum value and minimum value of the reflection index are alternately distributed with the change of the wavelength. The optical thickness of the transparent thin film is defined to be a product of a refractive index n of the thin film and an actual thickness d. B of FIG. 2 shows a typical reflectometric spectrum modulated by $\cos(1/\lambda)$. Under the situation of vertical incidence, the light is partially reflected by the two interfaces of the ordered porous nanometer thin film to be detected, and the following formula can be obtained:

$$R(\lambda)=R_1+R_2+2\sqrt{R_1 R_2}\cos(4\pi n_f d_f/\lambda) \qquad \text{Formula 1}$$

Wherein $R_1$ and $R_2$ are respectively a reflection index or a reflection strength of the two interfaces (interface 1 and interface 2) of the ordered porous thin film to be detected; $d_f$ is the thickness of the ordered porous thin film to be detected; $n_f$ is an average refractive index of the ordered porous thin film; $\lambda$ is a wavelength of incident light; $R(\lambda)$ is an overall reflection index or reflection strength of the interface 1 after the incident light with the wavelength $\lambda$ is reflected for multiple times by the ordered porous thin film; the overall reflection index or reflection strength is a reflection index or reflection strength presented after the light beams reflected for multiple times by the ordered porous nanometer thin film are coherently superimposed on the interface 1.

Maximum value of $R(\lambda)$ presents in formula 2:

$$2n_f d_f = \lambda m \qquad \text{Formula 2}$$

Wherein m is an absolute interference order of the maximum value, m=0, 1, 2 . . . . If the wavelength of the incident light is known, then the optical thickness of the thin film can be calculated through the formula 2 (the distribution of maximum value and minimum value). The combination of biomolecules in the pores of the ordered porous thin film, for example, an interaction between antigen and antibody, a hybridization reaction with DNA and the like, would change the overall refractive index of the thin film, thereby changing the optical thickness of the thin film, and causing the shift $(\Delta\lambda_{extremum})$ of the reflectometric interference spectrum. The change of the optical thickness of the thin film can be calculated by detecting the $\Delta\lambda_{extremum}$. The change of the optical thickness of the thin film is proportional to the amount of the biomolecules combined on the surface or in the internal pores thereof; and the interaction between biomolecules can be detected in a label-free manner.

Figure 6:
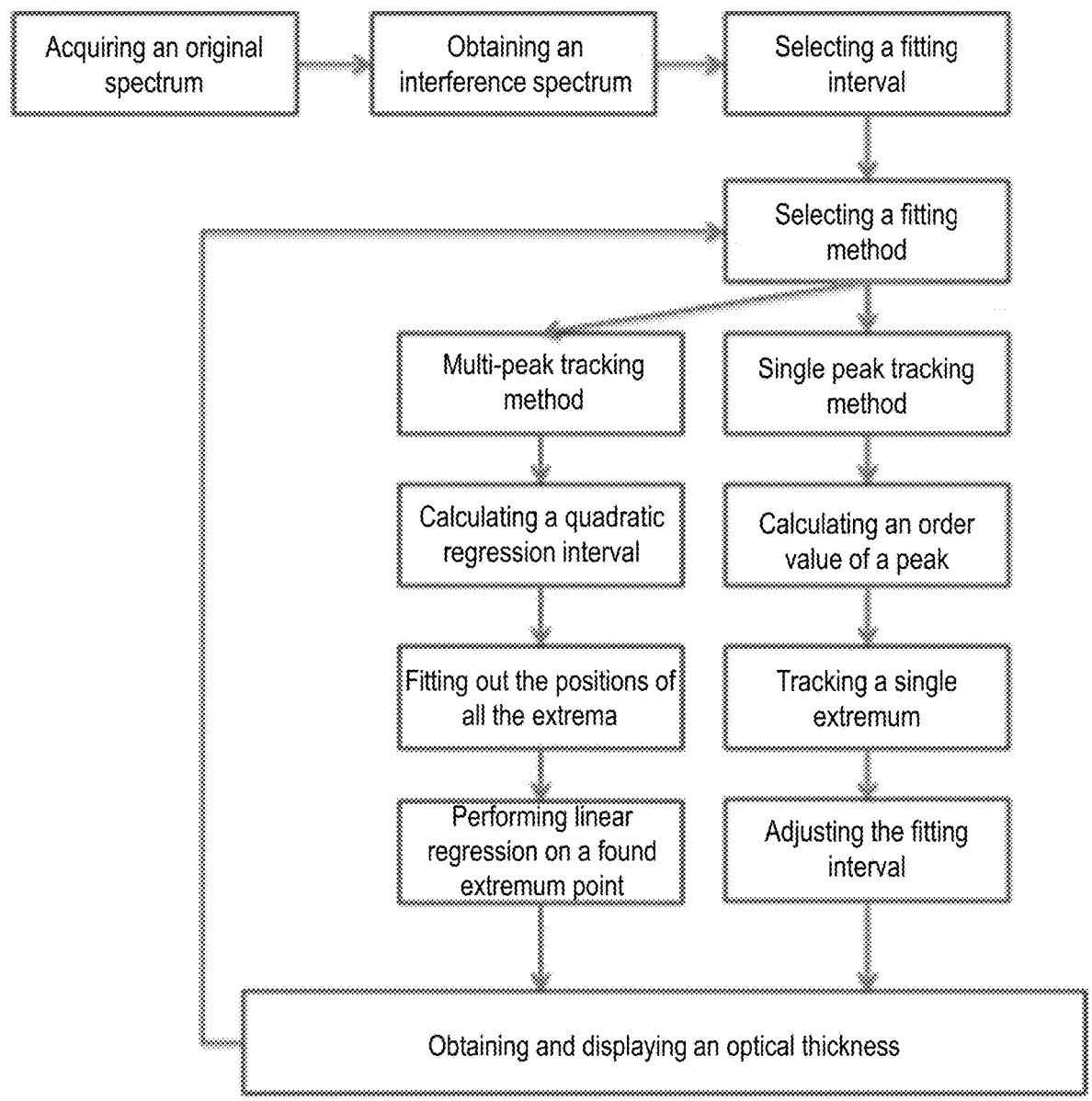
FIG. 6 is a flow how the control system converts in real time the obtained reflectometric interference spectrum into the optical thickness of the ordered porous thin film.

The control system of the present invention can control the optical fiber spectrometer, and convert in real time the obtained reflectometric interference spectrum into the optical thickness of the ordered porous thin film. The control system can adopt a known method in the art to control the optical fiber spectrometer, and convert in real time the obtained reflectometric interference spectrum into the optical thickness of the ordered porous thin film. Preferably, the flow how the control system converts in real time the obtained reflectometric interference spectrum into the optical thickness of the ordered porous thin film is shown in FIG. 6.

With regard to the multi-peak fitting method, it can be obtained from formula 2 that:

$$\frac{1}{\lambda} = \frac{1}{2n_f d_f}m \qquad \text{Formula 3}$$

It can be seen from formula 3 that the wave number $1/\lambda$ is proportional to an absolute order. However, generally speaking, the absolute interference order of a peak value is difficult to obtain. Therefore, formula 3 can be varied to be:

$$\frac{1}{\lambda} = \frac{1}{2n_f d_f}m = \frac{1}{2n_f d_f}\overline{m} + \frac{m_0}{2n_f d_f} \qquad \text{Formula 4}$$

Wherein $\overline{m}$ is a relative order, and the difference between $\overline{m}$ and the absolute order is a constant $m_0$. It can be seen from formula 4 that the wave number is also proportional to the relative order, and the slope is $$\frac{1}{2n_f d_f}.$$

Figure 7:
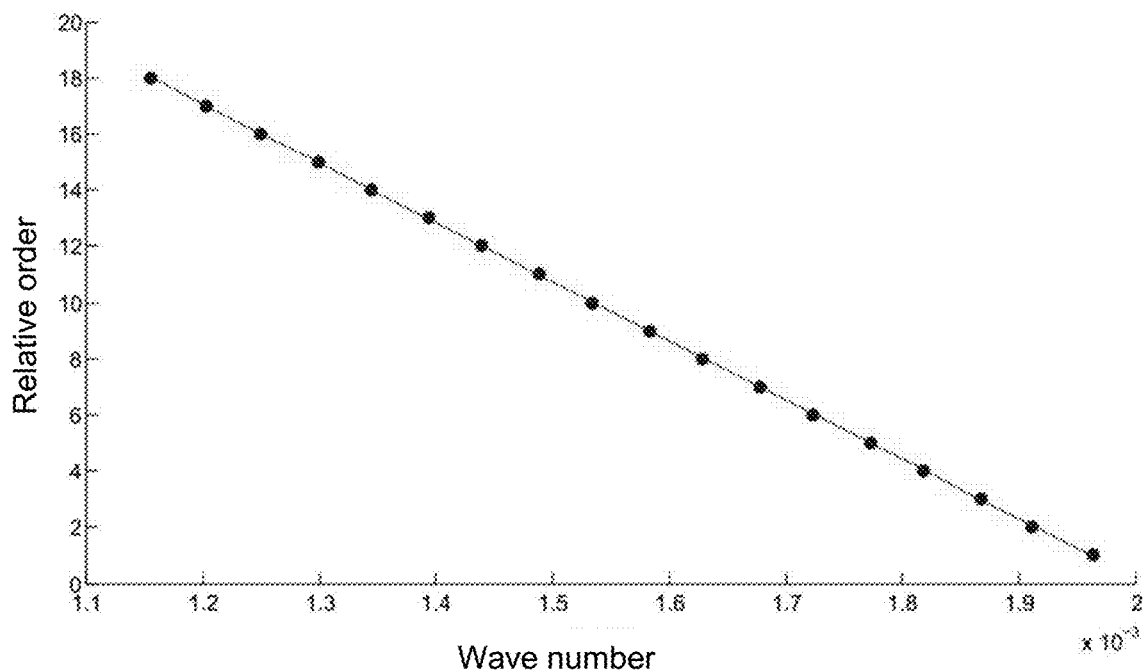
FIG. 7 is a relation curve between a wave number corresponding to a plurality of consecutive peaks and a relative order.

Therefore, the optical thickness of the thin film can be obtained by obtaining wavelength values corresponding to a plurality of consecutive peaks, performing linear regression, taking a reciprocal of the slope, and then being divided by 2. Hence, the absolute order of the peak is not required (as shown in FIG. 7).

With regard to the single peak fitting method, the principle thereof is: it is supposed that the absolute order of one peak or valley does not change, and the optical thickness is calculated in real time by tracking the change of wavelengths. According to formula 2, if a peak value $\lambda_1$ and an absolute order $m_1$ corresponding thereto are known, then the optical thickness can be calculated as follows:

$$n_f d_f = \frac{m_1 \lambda_1}{2} \qquad \text{Formula 5}$$

The absolute order $m_1$ can be calculated through the following formula:

$$m_1 = \text{round}\left(\frac{2\overline{n_f d_f}}{\lambda_1}\right) \qquad \text{Formula 6}$$

Wherein 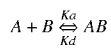 is an estimated value (initial value) of the optical thickness. The estimated value is obtained by performing a multi-peak fitting in the software control system of the present invention.

During detection of the biodetector of the present invention, the interaction between biomolecules can be represented by the following relation formula:

$$A + B \underset{K_d}{\overset{K_a}{\rightleftharpoons}} AB$$

Wherein A is the analyte; B is a ligand modified on the surface of the ordered porous thin film. Assuming that the interaction is a pseudo-first order reaction, when the sample to be detected is injected, the forming rate of a composite AB is:

$$\frac{d[AB]}{dt} = K_a[A][B] - K_d[AB]$$

Wherein $K_a$ is a constant combination rate, and $K_d$ is a constant dissociation rate.

Therefore, it can be derived that a relation between an instrument response value $\Gamma$ and time t is (the derivation process is omitted):

$$\Gamma = \Gamma_{eq}(1 - e^{-(K_a \cdot C + K_d) \cdot t})$$

Wherein $\Gamma_{eq}$ is the instrument response value when the combination of A and B achieves a dynamic balance (equivalent to $K_a = K_d$); C is the concentration of the analyte A, and remains unchanged during analysis. Similarly, in the dissociation process of the composite AB, the concentration of A is zero; $t_0$ is a start time of a dissociation reaction; and the relation between the instrument response value $\Gamma$ and the time during dissociation is simplified to be:

$$\Gamma = \Gamma_{eq}(e^{-K_d(t-t_0)})$$

In summary, in a flow cell, the reaction speed of the analyte and the ligand is restricted by two factors:

(i) the speed spreading the analyte to the surface of the sensing substrate, mainly influenced by flow rate, concentration and viscosity of the analyte, and slightly influenced by temperature, pH values, and ionic strength; such a restriction is called as mass transfer restriction; and (ii) an affinity constant between the analyte and the ligand, which is an intrinsic property of a reaction pair, and is mainly influenced by temperature, pH values, and ionic strength; such a restriction is called as an interaction restriction.

Correspondingly, two extreme cases are provided:

(i) when the flow rate of the sample solution is extremely quick or the concentration of the analyte is extremely great (or the density of the ligand on surface is extremely low), the combination reaction is only restricted by the interaction, and is used to perform an interaction kinetic detection; and a nonlinear fitting can be performed on the result by a kinetic formula of the pseudo-first order reaction;

(ii) on the contrary, when the flow rate of the sample solution is extremely slow or the concentration of the analyte is extremely low (or the density of the ligand on surface is extremely great), the combination reaction is only restricted by mass transfer, and the reaction speed mainly depends on the concentration of the analyte. The principle can be utilized to detect the concentration of the analyte. A combination curve is nonlinearly fit to obtain an initial reaction speed in combination with a kinetic curve; the initial reaction speeds of the analytes with a series of standard concentrations are utilized to draw a standard curve, that is, the initial reaction speeds can be used to measure the concentration of an analyte solution with an unknown concentration.

The reflected light probe can be disposed above the ordered porous thin film, and can also be disposed under the ordered porous thin film, that is, the reflectometric interference spectrum of the ordered porous thin film can be detected from both sides of the ordered porous thin film. Preferably, the reflected light probe is disposed under the ordered porous thin film, in which case an upper layer of the ordered porous thin film and an interior of the ordered porous thin film are treated as the reaction cell, and operations during detection are all performed above the ordered porous thin film, thereby having no mutual influence, facilitating operation, and causing no influence to a detection result even when liquid to be detected is muddy.

The biodetector further includes a flow injection system for controlling the flow of liquid in the detection cell, a temperature control system for controlling the temperature in the detection cell, and a software control system for controlling the optical fiber spectrometer and analyzing the reflectometric interference spectrum of the sensing unit to obtain an optical thickness of the sensing unit. The flow injection system can select any existing devices which can inject a solution of the sample to be detected into the detection cell, for example, the peristaltic pump 15. The flow injection system and the temperature control system, as control units of liquid flow and temperature in the detection cell, fix the sensing unit in the detection cell. The introduction of the flow injection system and the temperature control system can provide a good reaction condition for biological detection.

Utilizing the biodetector to analyze the changes of the concentration, adsorption rate, and geometric sizes of analytes in the sample includes the following operation steps:

(1) with regard to a simple sample:

(i) fixing the porous film in the detection cell, injecting a blank solution containing no sample, and enabling the solution to fill the porous film and be full of the detection cell;

(ii) initializing the instrument and establishing a film thickness measurement model (performing background scan and reference scan on the biodetector, and selecting a fitting method (single peak fitting or multi-peak fitting) for obtaining the optical thickness);

(iii) remaining the blank solution flowing at a certain speed, and recording an optical thickness response baseline of the entire detector (last about 10 min);

(iv) modifying the porous film (including physical modification, chemical modification, and biological modification), and enabling the porous film to adsorb the analyte;

v) injecting a certain amount of sample solution, and recording the time dependent curve of the optical thickness of the thin film; and (vi) after the optical thickness is stable for a certain time, injecting the blank solution to clean the entire system, and washing off the uncombined sample. The parameters such as the concentration, adsorption rate of the substance in the sample are analyzed according to the obtained time dependent curve of the optical thickness of the thin film.

(2) with regard to a complex sample:

(i) fixing the porous film in the detection cell, injecting a blank solution containing no sample, and enabling the solution to fill the porous film and be full of the detection cell;

(ii) initializing an instrument and establishing a film thickness measurement model (performing background scan and reference scan on the biodetector, and selecting a fitting method (single peak fitting or multi-peak fitting) for obtaining the optical thickness);

(iii) remaining the blank solution flowing at a certain speed, and recording an optical thickness response baseline of the entire detector (last about 10 min);

(iv) modifying the thin film according to the principles such as biological reaction and the like, enabling the thin film to specifically combine the analyte, and reducing the non-specific adsorption of the thin film;

v) injecting a certain amount of sample solution, and recording the time dependent curve of the optical thickness of the thin film;

(vi) after the optical thickness is stable for a certain time, injecting the blank solution to clean the entire system, and washing off the uncombined sample; and (vii) if necessary, another substance which cannot generate a specific reaction with the analyte can be selected to prove that the change of the optical thickness in the step (vi) is indeed caused by the combination of the analyte.

The parameters such as the concentration, adsorption rate of the substance in the sample are analyzed according to the obtained time dependent curve of the optical thickness of the thin film.

Embodiment 1

Figure 4A:
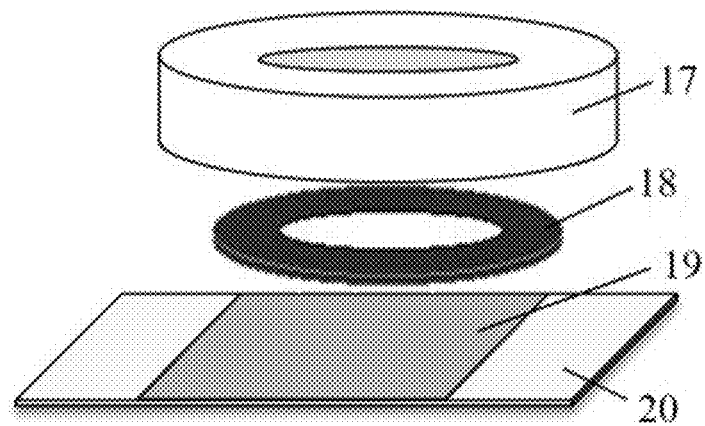
FIG. 4(A) is an exploded schematic view of the reaction cell for modifying the sensing substrate.
Figure 4B:
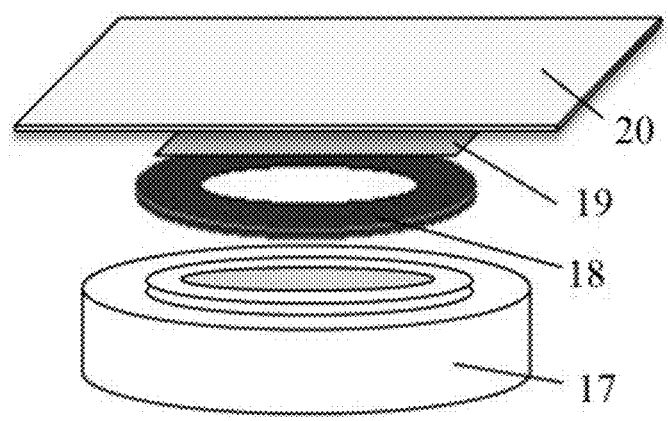
FIG. 4(B) is an exploded schematic view of the reaction cell for modifying the sensing substrate in a direction opposite to that in FIG. 4(A)

The concentration of hepatitis B surface antigen (HBsAg) in a solution was detected by the biodetector of the present invention, wherein the sensing unit is an ordered porous polystyrene thin film with three-dimensional ordered nanopores with a pore size of 200 nm. The specific steps are as follows:

1) Modifying Sensing Unit (Coating of Antibody):

A PTFE reaction cell 17 with an inner diameter of about 7 mm was taken, its sides were sealed with a rubber cushion 18, and the PTFE reaction cell 17, the rubber cushion 18, a sensing sheet 19, and a slide 20 were compressed together using a small stationery clip, as shown in FIG. 4. The sensing sheet 3 is an ordered porous polystyrene thin film. 200 μl of a coating solution was injected into the above-mentioned PTFE reaction cell. The coating solution is obtained by dissolving Anti-HBs monoclonal antibody in 0.05 M carbonate buffer (CB buffer) at pH 9.6, wherein the concentration of Anti-HBs monoclonal antibody is 5 μg/ml. The reaction cell with the injected coating liquid was placed in a wet box at 4° C. overnight, and then the reaction cell was taken out from the wet box and the coating solution was discarded. The ordered porous polystyrene thin film was washed with 50 mM PBS buffer at pH 7.4 containing 0.02% Tween-20 (washing buffer) and deionized water respectively, 5 times each. 1% bovine serum albumin was then injected into the reaction cell to block at 37° C. for 1 hour, and then the blocking solution was discarded. Washing was conducted using 50 mM PBS buffer at pH 7.4 containing 0.02% Tween-20 (wash buffer) and deionized water, 5 times each, to obtain the modified sensing unit. The modified sensing unit was fixed on a detection cell.

2) Plotting standard curve: A series of different concentrations of hepatitis B surface antigen (HBsAg) solutions were prepared with PBS buffer (pH 7.4, 0.05 M), with the HBsAg concentration in the HBsAg solutions being 1 ng/ml, 10 ng/ml, 50 ng/ml, 100 ng/ml, 250 ng/ml, 1000 ng/ml, 5000 ng/ml, and 10000 ng/ml respectively. The prepared hepatitis B surface antigen (HBsAg) solutions of different concentrations were injected into the detection cell at a flow rate of 400 μl/min, as the experimental groups. In addition, as a control group, 1% (w/v) bovine serum albumin (BSA) solution (prepared in PBS 7.4 buffer) was injected into the detection cell. The changing curve of optical thickness of the ordered porous polystyrene thin film of individual experimental groups and the control group against time after the HBsAg solution was injected into the detection cell was recorded. After the optical thickness of the ordered porous polystyrene thin film stabilized, eluting was conducted with PBS buffer.

Figure 5A:
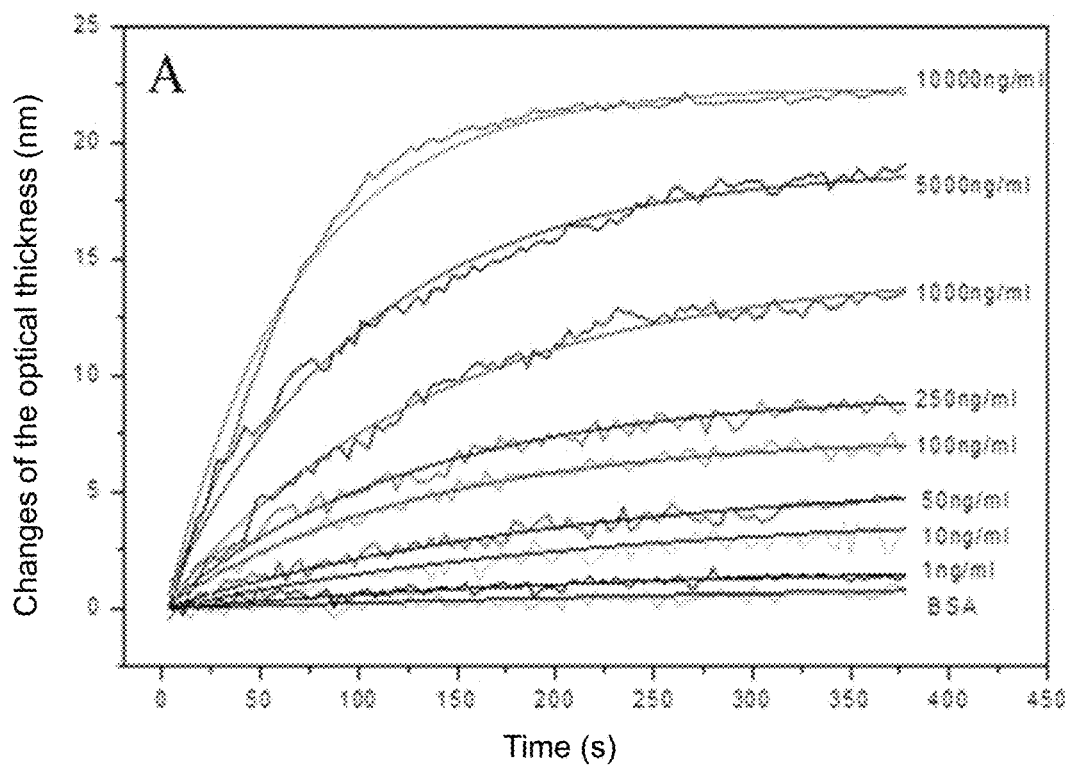
FIG. 5(A) is a fitting curve and a time dependent curve of the relative optical thickness of the thin film caused by specifically combining different concentrations of hepatitis B surface antigens and the ordered porous thin film acting as the sensing unit.

The part within 360 s starting from the initial rising point of the changing curve of the detected increase in optical thickness of each ordered porous polystyrene thin film against time as the HBsAg solution was injected into the detection cell was separated, and was nonlinearly simulated. The most suitable fitting formula for the binding curve for each concentration is of an exponential growth model (see FIG. 5(A) in the specification), with the formula being as follows:

$$y(t)=A(1-e^{-kt})$$

Figure 5B:
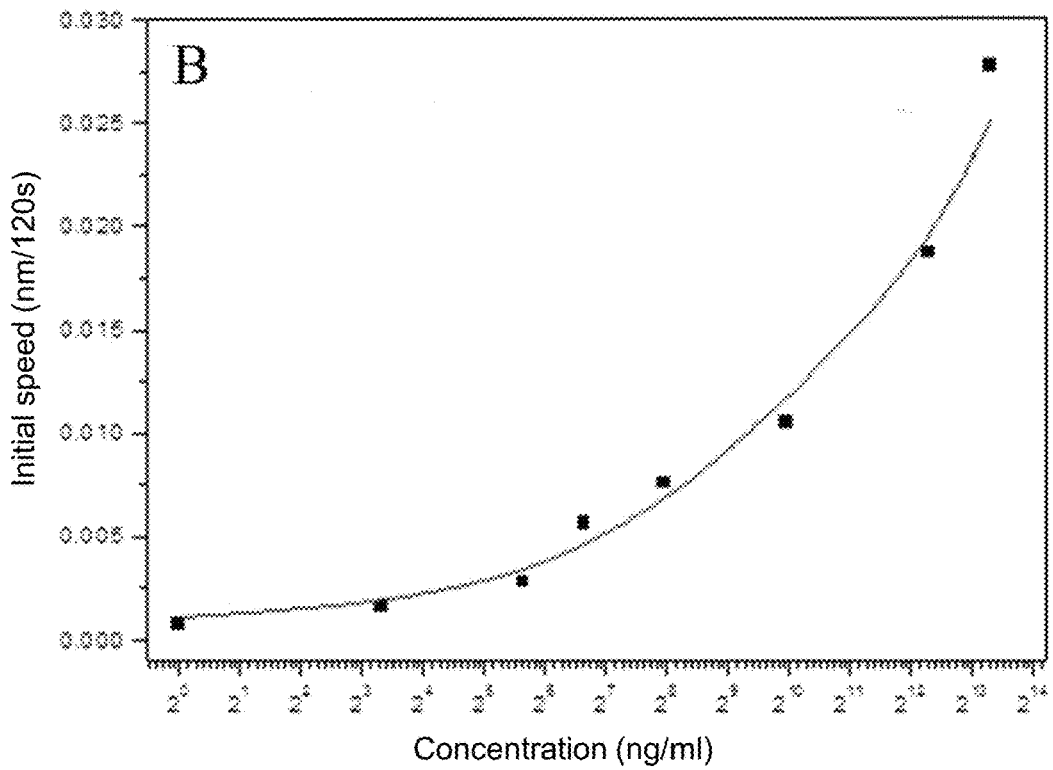
FIG. 5(B) is the curve of an initial change speed (equivalent to a change speed when the optical thickness of the thin film starts to change) of the relative optical thickness with the concentration of the hepatitis B surface antigen.

The initial velocity is the value of y'(t) at t=0, that is, y'(0)=A*k. Table 1 lists the measured A, k, A*k, SE (standard error) and CC (correlation coefficient) in the curve fitting results of the HBsAg solutions at different concentrations. A curve of the HBsAg concentration was plotted according to the K*A data in the table to obtain a detection standard curve (see FIG. 5(B) in the specification).

TABLE 1

| Concentration (ng/ml) | A | k | A*k | Standard error | Correlation coefficient |
| --- | --- | --- | --- | --- | --- |
| 10000 | 22.4314 | 0.0124 | 0.2781 | 0.0661091 | 0.9932001 |
| 5000 | 18.9291 | 0.00992 | 0.1878 | 0.0524734 | 0.9936491 |
| 1000 | 14.6325 | 0.00718 | 0.1051 | 0.0427639 | 0.9939674 |
| 250 | 9.0472 | 0.00839 | 0.0759 | 0.0339544 | 0.9887502 |
| 100 | 7.4757 | 0.00759 | 0.0567 | 0.0233428 | 0.9925804 |
| 50 | 5.2023 | 0.00546 | 0.0284 | 0.0283221 | 0.9759836 |
| 10 | 4.1204 | 0.00395 | 0.0163 | 0.0331216 | 0.9443751 |
| 1 | 1.6084 | 0.00505 | 0.00812 | 0.0177834 | 0.9390732 |
| BSA | 16.826115 | 0.000106 | 0.001784 | 0.0198931 | 0.7623374 |

3) Detecting the concentration of HBsAg solution to be tested: 0.0851 g of HBsAg was measured, and diluted to 100 ml with PBS to obtain a HBsAg solution to be tested with a concentration of 851 ng/ml. This HBsAg solution to be tested was injected into a flow cell at a flow rate of 400 μl/min, the curve was recorded, and eluting was conducted with PBS buffer after equilibration. The part within 360 s starting from the initial rising point of the obtained binding curve was separated and subjected to a nonlinear fitting. The specific concentration of the solution to be tested was obtained based on the specific value of the initial velocity A*k in the fitted data corresponding to the standard curve plotted in step 2). The specific concentration of the solution to be tested obtained in this example is 850 ng/ml, which is very close to the actual concentration of 851 ng/ml, with the relative error being only 0.12%.

Embodiment 2

Figure 8:
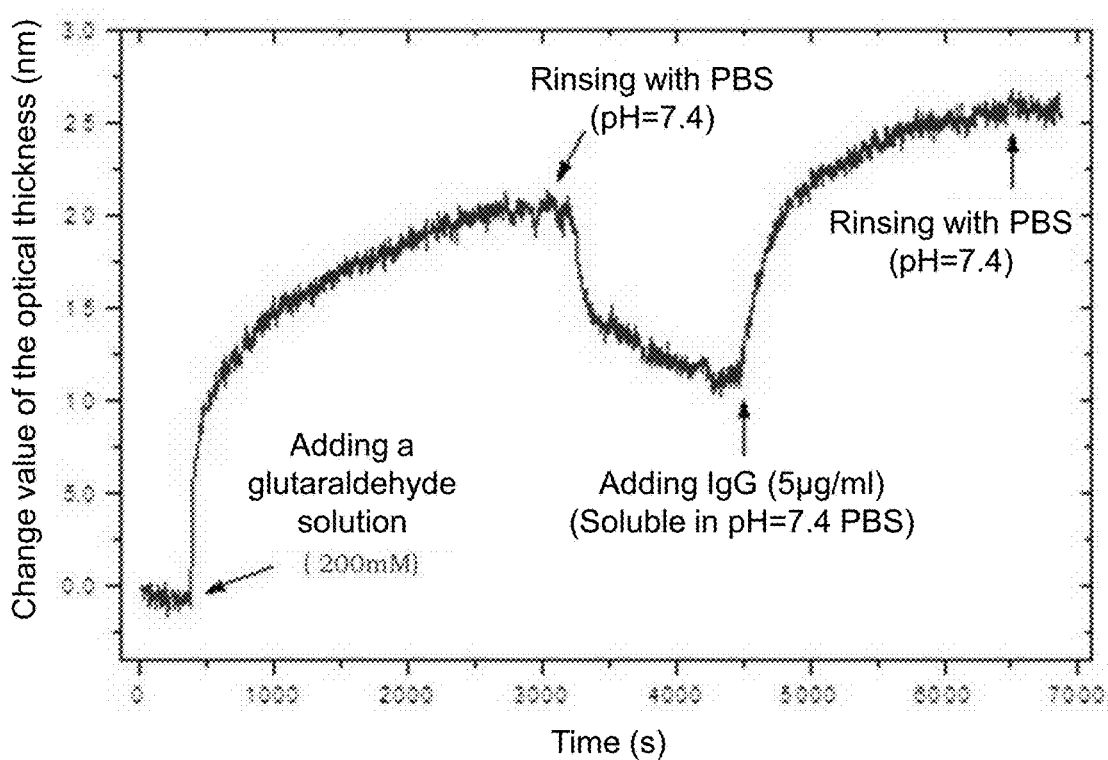
FIG. 8 is a time dependent curve of the optical thickness changes of an ordered porous polystyrene thin film caused by a covalent coupling effect between glutaraldehyde (GA) and IgG in human serum.

The covalent coupling between glutaraldehyde (GA) and IgG (ie antibody) in human serum was observed using the biodetector of the present invention, wherein the sensing unit is an ordered porous polystyrene thin film with three-dimensional ordered nanopores with a pore size of 200 nm. The specific steps are as follows:

1) An ordered porous polystyrene thin film sensing sheet with three-dimensional ordered nanopores was fixed in a detection cell, and a certain amount of absolute ethanol was injected into the detection cell to fill the detection cell; 0.05 M PBS buffer at pH 7.4 was injected into the detection cell at a rate of 200 μl/min, and the changing curve of optical thickness of the ordered porous polystyrene thin film sensing sheet against time was recorded until it became stable;

2) A glutaraldehyde solution was prepared (the glutaraldehyde solution was prepared from 0.05 M PBS buffer at pH 5.0, and the glutaraldehyde concentration in the glutaraldehyde solution was 200 mM). The glutaraldehyde solution was injected into the detection cell at a flow rate of 200 μl/min. After the optical thickness change curve of the ordered porous polystyrene thin film sensing sheet became stable, the same PBS buffer as in step 1) was injected into the detection cell for washing, and the change in optical thickness of the ordered porous polystyrene thin film sensing sheet was recorded until it became stable again;

3) An antibody solution (the antibody solution was prepared with 0.05 M PBS buffer at pH 7.4, and the antibody concentration in the antibody solution was 5 μg/ml) was injected into the detection cell, and the optical thickness change curve of the ordered porous polystyrene thin film sensing sheet was recorded until it became stable; and then the same PBS solution as in step 1) was injected to wash again, and the optical thickness change of the ordered porous polystyrene thin film sensing sheet was recorded until it became stable again;

4) Result analysis: The changing curve of optical thickness of the ordered porous polystyrene thin film sensing sheet in steps 1) to 3) against time is shown in FIG. 8. As shown in FIG. 8, from the glutaraldehyde binding curve, it can be seen that after the glutaraldehyde solution was injected into the detection cell, the optical thickness of the ordered porous polystyrene thin film sensing sheet was increased by 20 nm at first, which reached the level of adsorption of antibody molecules, but the molecular weight of glutaraldehyde is relatively small (100.12), which is far smaller than the molecular weight of the antibody (150 kDa), so how can it produce such a large signal? This may be because glutaraldehyde self-polymerizes in the aqueous solution to form larger particles with a compact structure and a larger refractive index than that of relatively loose antibody molecules, so the optical thickness increases significantly. Another characteristic of the binding curve of glutaraldehyde is that when the glutaraldehyde solution is injected, there is a rapid thickness increase first, and then there is a continuous rise of thickness. It is speculated that it may first be the adsorption of glutaraldehyde particles, and then the further aggregation of glutaraldehyde particles on the surface with the glutaraldehyde in the solution that result in a continuous increase in thickness. In the subsequent elution process, the binding curve decreased significantly, and finally stabilized at the level of 12 nm, indicating that the short-time glutaraldehyde modification with high concentration has many loose bindings and is easily eluted. Next, after the antibody solution was injected into the detection cell, the ordered porous polystyrene thin film sensing sheet interacted with the antibody (5 μg/ml) through the surface modified by glutaraldehyde, so that the optical thickness curve shows a continuous upward trend. The thickness increase rate is about 38 pm/s, and the interaction produced an optical thickness increase of about 14 nm within 30 minutes. After washing again with PBS solution, no obvious curve drop was found, from which it can be inferred that the covalent coupling of the antibody is relatively strong.

Embodiment 3

The interaction between staphylococcal protein A (SPA) and Immunoglobulin G (IgG) in human serum was observed using the biodetector of the present invention, wherein the sensing unit is an ordered porous polystyrene thin film with three-dimensional ordered nanopores with a pore size of 200 nm. The specific steps are as follows.

Figure 9:
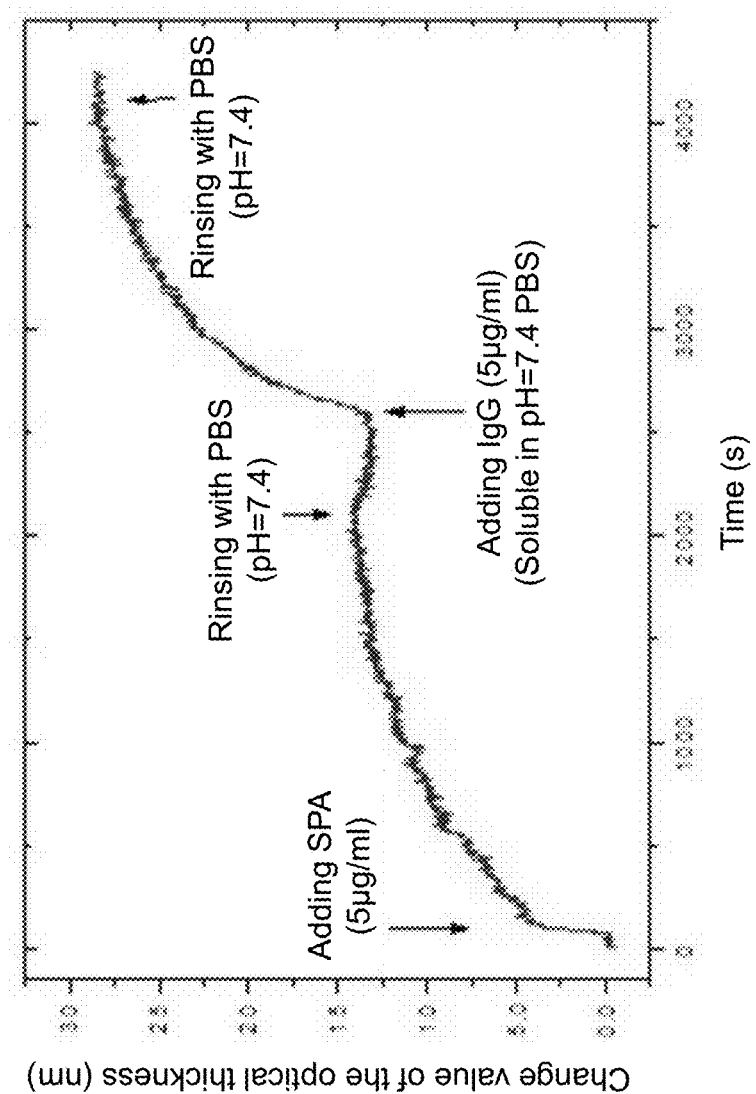
FIG. 9 is a time dependent curve of the optical thickness changes of the ordered porous polystyrene thin film caused by an interaction between staphylococcal protein A (SPA) and IgG in human serum.

1) An ordered porous polystyrene thin film sensing sheet with three-dimensional ordered nanopores was fixed in a detection cell, and a certain amount of absolute ethanol was injected into the detection cell to fill the detection cell; a 0.05 M PBS buffer at pH 7.4 was injected into the detection cell at a rate of 200 μl/min, and the curve of the optical thickness of the ordered porous polystyrene thin film sensing sheet against time is recorded until it became stable;

2) A SPA solution (the SPA solution was prepared in 0.05 M CB buffer at pH 9.6, and the SPA concentration in the SPA solution was 5 μg/ml) into the detection cell at a flow rate of 200 μl/min. After the optical thickness change curve of the ordered porous polystyrene thin film sensing sheet became stable, the same PBS buffer as in step 1) was injected, and the change in the optical thickness of the ordered porous polystyrene thin film sensing sheet was recorded until it became stable again;

3) An antibody (IgG) solution (the antibody solution was prepared with 0.05 M PBS buffer at pH 7.4, and the antibody concentration in the antibody solution was 5 μg/ml) was injected, and the optical thickness change curve of the ordered porous polystyrene thin film sensing sheet was recorded until it became stable; and then the same PBS solution as in step 1) was injected to wash again, and the optical thickness change of the ordered porous polystyrene thin film sensing sheet was recorded until it became stable again;

4) Result analysis: The above-mentioned curve of optical thickness changed with time is shown in FIG. 9. SPA can be physically adsorbed onto the surface of the ordered porous polystyrene thin film through hydrophobic interaction. The initial SPA adsorption led to an increase in the optical thickness of the ordered porous polystyrene thin film sensing sheet by 15 nm. The subsequent PBS washing only caused an optical thickness decrease of 1.4 nm. This shows that the hydrophobic interaction between SPA and the thin film is relatively strong. Next, after adding antibody molecules, the optical thickness of the ordered porous polystyrene thin film sensing sheet slowly increased at a rate of about 20 pm/s, which is slower than the binding rate of glutaraldehyde crosslinking in Example 2. When the binding between SPA and the antibody was close to equilibrium (corresponding to the observation that the optical thickness is basically no longer changed), the optical thickness of the ordered porous polystyrene thin film sensing sheet increased by about 15 nm. PBS washing did not cause obvious antibody dissociation, indicating that the binding between SPA and the antibody is also relatively strong.

Although the embodiments do not cover all biological parameters that can be analyzed by the biological detector of the present invention, those skilled in the art can foresee that, by detecting the optical thickness change of the sensing unit caused by the sample using the biological detector, on the basis of the above-mentioned embodiments, other biological parameters can be analyzed only in conjunction with their own professional attempts without the need to pay creative effort. Due to limited space, only representative embodiments are listed here.

What is claimed is:

1. A biodetector based on an interference effect of a thin film with ordered porous nanostructures, the biodetector comprising:
    a detection cell, comprising a substrate;
    a sensing unit disposed in the detection cell and on the substrate, wherein the sensing unit is an ordered porous thin film provided with three-dimensional ordered nanopores, the ordered porous thin film is transparent, and diameters of the nanopores are 20 nm-500 nm;
    an optical fiber spectrometer for detecting a reflectometric interference spectrum of the sensing unit; and
    a control system for controlling the optical fiber spectrometer and analyzing the reflectometric interference spectrum to obtain an optical thickness of the sensing unit,
    wherein the control system to analyze the reflectometric interference spectrum to obtain an optical thickness change of the sensing unit is configured to obtain the reflectometric interference spectrum of the sensing unit; and use a single peak fitting method or a multi-peak fitting method to obtain a time dependent curve of the optical thickness of the sensing unit according to the reflectometric interference spectrum,
    wherein the nanopores are spherical, and any two adjacent nanopores of the nanopores penetrate with each other,
    wherein the sensing unit has a top and a bottom opposite the top, a sample to be detected enters the nanopores from the top of the sensing unit, and the substrate contacts the bottom of the sensing unit,
    wherein the optical fiber spectrometer comprises a broad frequency light source, a Y-type optical fiber bundle, a reflected light probe, an entrance slit, a grating, and a detector; and the reflected light probe is disposed under the sensing unit and adjacent to the bottom of the sensing unit, so that the reflectometric interference spectrum can be detected by the reflected light probe from the bottom of the sensing unit.

2. The biodetector based on the interference effect of the thin film with the ordered porous nanostructures according to claim 1, wherein a material of the ordered porous thin film is silica, polystyrene, polystyrene doped with BTO/ITO nano-particles, epoxy resin, epoxy resin doped with BTO/ITO nano-particles, polymethyl methacrylate, or polymethyl methacrylate doped with BTO/ITO nano-particles.

3. The biodetector based on the interference effect of the thin film with the ordered porous nanostructures according to claim 1, wherein a wavelength of the broad frequency light source is 400 nm-1200 nm.

4. The biodetector based on the interference effect of the thin film with the ordered porous nanostructures according to claim 1, wherein the biodetector further comprises a flow injection system for controlling a flow of liquid in the detection cell, and a temperature control system for controlling a temperature in the detection cell.

5. The biodetector based on the interference effect of the thin film with the ordered porous nanostructures according to claim 4, wherein the flow injection system comprises a peristaltic pump.

6. A method for using the biodetector based on the interference effect of the thin film with the ordered porous nanostructures according to claim 1 to detect biomolecules, wherein the method comprises the following steps:
    1) modifying the ordered porous thin film, and enabling the ordered porous thin film to immobilize the biomolecules to be detected, wherein when a sample to be detected is a complex sample, the modification refers to a process of enabling the ordered porous thin film to specifically immobilize the biomolecules to be detected;
    2) injecting a solution of the sample to be detected into the detection cell, and detecting a time dependent curve of an optical thickness of the ordered porous thin film; and
    3) qualitatively or quantitatively analyzing the biomolecules to be detected according to the time dependent curve of the optical thickness of the ordered porous thin film detected in the step 2).

7. The method according to claim 6, wherein in the step 3), qualitatively or quantitatively analyzing the biomolecules to be detected comprises analyzing a concentration, a binding rate, an interaction, or geometric sizes of the biomolecules in the solution of the sample to be detected.

8. The method according to claim 6, wherein in the step 2), the method of detecting the time dependent curve of the optical thickness of the ordered porous thin film comprises the following steps:
    1) obtaining the reflectometric interference spectrum of the sensing unit; and
    2) using the single peak fitting method or the multi-peak fitting method to obtain the optical thickness of the sensing unit according to the reflectometric interference spectrum obtained in the step 1).

* * * * *